United States Patent
Kawamura

(10) Patent No.: US 11,993,147 B2
(45) Date of Patent: May 28, 2024

(54) HEAD-UP DISPLAY APPARATUS

(71) Applicant: JVCKENWOOD Corporation, Yokohama (JP)

(72) Inventor: Ken Kawamura, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 18/101,541

(22) Filed: Jan. 25, 2023

(65) Prior Publication Data

US 2023/0166595 A1   Jun. 1, 2023

Related U.S. Application Data

(63) Continuation of application No. PCT/JP2021/007913, filed on Mar. 2, 2021.

(30) Foreign Application Priority Data

Sep. 16, 2020   (JP) ................. 2020-155196

(51) Int. Cl.
  *B60K 35/00* (2024.01)
  *B60K 35/23* (2024.01)

(52) U.S. Cl.
  CPC .............. *B60K 35/00* (2013.01); *B60K 35/23* (2024.01); *B60K 2360/23* (2024.01); *B60K 2360/29* (2024.01); *B60K 2360/334* (2024.01)

(58) Field of Classification Search
  None
  See application file for complete search history.

(56) References Cited

U.S. PATENT DOCUMENTS

| | | | | |
|---|---|---|---|---|
| 5,760,931 A | * | 6/1998 | Saburi | G02B 27/0149 359/13 |
| 2009/0244669 A1 | | 10/2009 | Uchikawa | |
| 2012/0039347 A1 | | 2/2012 | Uchikawa | |
| 2012/0170130 A1 | * | 7/2012 | Sasaki | B60K 35/00 359/630 |
| 2020/0126305 A1 | * | 4/2020 | Cappuccilli | B60K 35/00 |

(Continued)

FOREIGN PATENT DOCUMENTS

| JP | S64-38718 A | 2/1989 |
|---|---|---|
| JP | H07-285357 A | 10/1995 |

(Continued)

OTHER PUBLICATIONS

International Search Report for related International Application No. PCT/JP2021/007913, dated Apr. 13, 2021 (6 pages).

*Primary Examiner* — Stephen T. Reed
(74) *Attorney, Agent, or Firm* — Procopio, Cory, Hargreaves & Savitch LLP

(57) ABSTRACT

A head-up display apparatus projects a virtual image to be perceived by a user onto a virtual image display part provided in front of the user. The head-up display apparatus includes a display light emitting unit and a display light reflection unit. The display light emitting unit emits display light. The display light reflection unit reflects the display light and emits the reflected display light. The display light reflection unit includes a mirror part having a concave shape and a transmissive-type volume hologram part provided on a surface of the mirror part.

6 Claims, 2 Drawing Sheets

(56) References Cited

U.S. PATENT DOCUMENTS

2020/0393675 A1* 12/2020 Huang ................ G02B 3/0037
2023/0273429 A1* 8/2023 Choi ..................... G02B 7/198
　　　　　　　　　　　　　　　　　　　　　　　359/630

FOREIGN PATENT DOCUMENTS

JP　　　2009-251004 A　　10/2009
JP　　　2010-113172 A　　　5/2010

* cited by examiner

HEAD-UP DISPLAY APPARATUS

CROSS REFERENCE TO RELATED APPLICATION

The present application is based upon and claims the benefit of priority from Japanese Patent Application No. 2020-155196, filed on Sep. 16, 2020, the disclosure of which is incorporated herein in its entirety by reference.

BACKGROUND

The present invention relates to a head-up display apparatus.

In vehicles such as automobiles, use of head-up display apparatuses, which display information for users on windshields, is becoming widespread. In general, a head-up display apparatus magnifies and reflects video-image light by using a concave mirror, and projects the magnified and reflected video-image light onto a combiner or a windshield. In this way, the head-up display apparatus enables a user such as a driver to visually recognize virtual images.

It has been proposed to increase the display range of such a head-up display apparatus. For example, in a head-up display apparatus disclosed in Japanese Unexamined Patent Application Publication No. H7-285357, light containing information emitted from light-emitting display means is magnified and diffracted by a first hologram, and a second diffracted image is magnified and diffracted by a second hologram. Then, the magnified and diffracted image is reflected by a combiner toward the observation place of a driver.

SUMMARY

However, in the technology disclosed in Japanese Unexamined Patent Application Publication No. H7-285357, the volume of the whole apparatus increases as the number of reflective components increases. Further, if the magnification of the concave mirror is increased in order to minimize the increase in size of the apparatus, the aberration of the lens increases as a consequence. As a result, virtual images recognized by the user may be distorted and/or virtual images may go out of focus.

Embodiments according to the present application have been made in order to solve such problems, and thereby to provide a head-up display apparatus capable of displaying satisfactory images while minimizing the increase in size of the apparatus.

A head-up display apparatus according to an embodiment projects a virtual image to be perceived by a user onto a virtual image display part provided in front of the user. The head-up display apparatus includes a display light emitting unit and a display light reflection unit. The display light emitting unit emits display light. The display light reflection unit reflects the display light and emits the reflected display light. The display light reflection unit includes a mirror part having a concave shape, and a transmissive-type volume hologram part provided on a surface of the mirror part.

According to the embodiment, it is possible to provide a head-up display apparatus capable of displaying satisfactory images while minimizing the increase in size of the apparatus.

DETAILED DESCRIPTION

For clarifying the explanation, the following descriptions and drawings are partially omitted and simplified as appropriate. Note that the same symbols are assigned to the same elements throughout the drawings and redundant explanations thereof are omitted as appropriate.

Embodiment

Embodiments according to the present invention will be described hereinafter with reference to the drawings. A head-up display apparatus according to this embodiment is an apparatus that projects virtual images to be perceived by a user onto a virtual image display part provided in front of the user. More specifically, the head-up display apparatus according to this embodiment is installed in an automobile, and projects virtual images containing certain information onto the windshield of the automobile while using the windshield as the virtual image display part. In this way, the head-up display apparatus displays the information for the driver, i.e., for the user.

Figure 1:
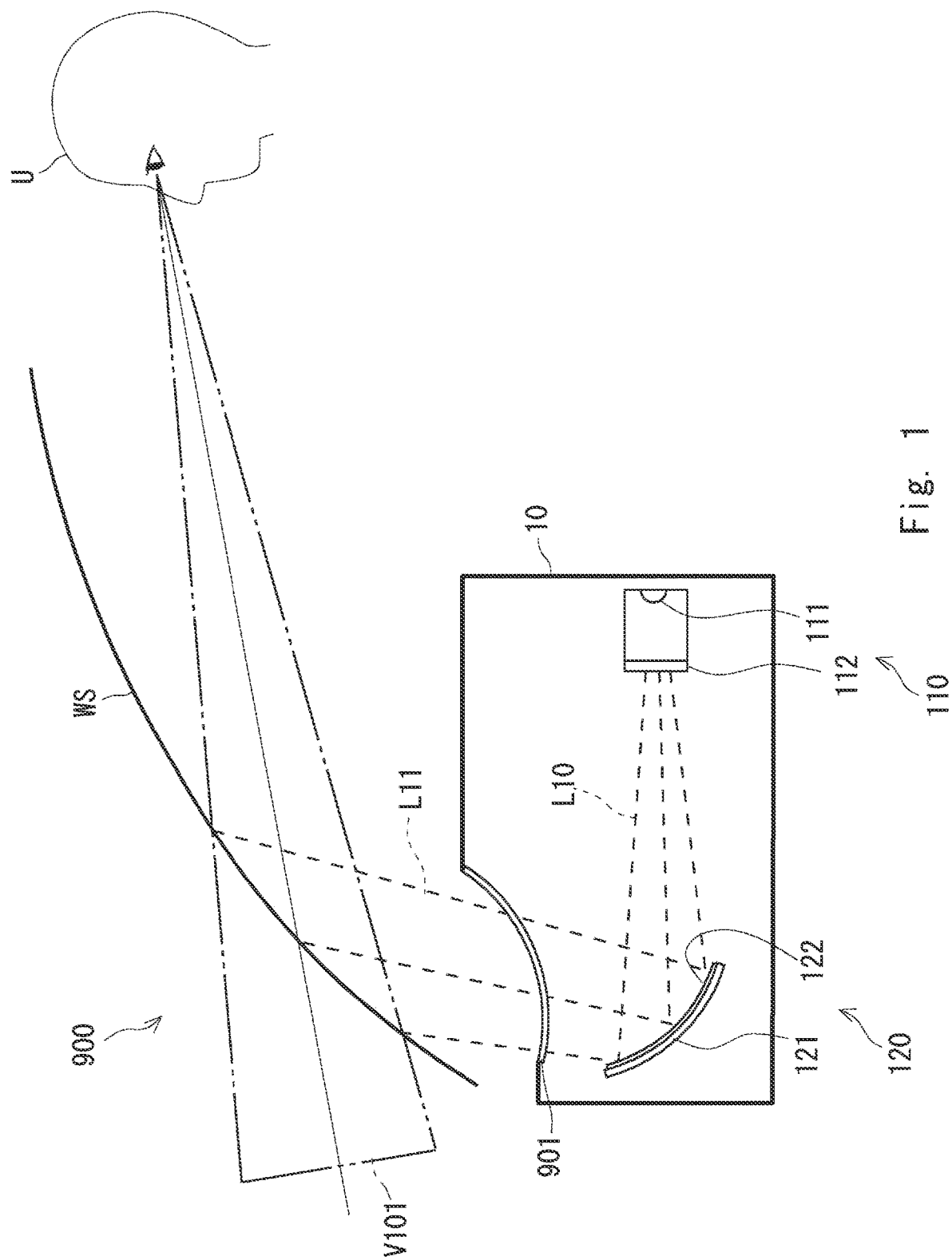
FIG. 1 is a schematic diagram showing a configuration of a head-up display apparatus according to an embodiment.

A configuration of a head-up display apparatus according to a first embodiment will be described with reference to FIG. 1. FIG. 1 is a schematic diagram showing the configuration of the head-up display apparatus according to the first embodiment. In the figure, an automobile 900, a user U of the automobile 900, and a head-up display apparatus 10 are schematically shown as viewed in the lateral direction of the automobile 900.

The head-up display apparatus 10 is housed inside a dashboard of the automobile 900. The head-up display apparatus 10 includes, as main components, a display light emitting unit 110 and a display light reflection unit 120.

The display light emitting unit 110 generates display light and emits the generated display light to the display light reflection unit 120. The display light emitting unit 110 includes, as main components, a light source generation part 111 and a display light generation part 112.

The light source generation part 111 is a light source that generates predetermined light, such as LEDs (Light-Emitting Diodes) or a semiconductor laser. The light source generation part 111 emits the generated light to the display light generation part 112.

The display light generation part 112 includes, for example, a transmissive-type liquid-crystal panel. When the transmissive-type liquid-crystal panel of the display light generation part 112 receives light generated by the light source generation part 111, the display light generation part 112 generates display light containing information displayed on the liquid crystal panel. That is, the display light generation part 112 generates display light L10 by letting light received from the light source generation part 111 pass therethrough, and then emits the generated display light L10.

The display light reflection unit 120 receives the display light L10 coming from the display light emitting unit 110, reflects the received display light L10 at a preset angle, and thereby emits reflected light L11 to a windshield WS. The reflected light L11 emitted from the display light reflection unit 120 is projected onto the windshield WS through a transmissive plate 901 disposed in the dashboard of the automobile 900. The display light reflection unit 120 includes, as main components, a mirror part 121 and a transmissive-type volume hologram part 122.

The mirror part 121 is a concave mirror formed in a concave shape. The mirror part 121 is, for example, a glass substrate of which a metal having a high reflectivity is deposited on the surface. The mirror part 121 may be aspherical or spherical. The mirror part 121 receives the display light L10 through the transmissive-type volume hologram part 122 and reflects the received display light L10.

The transmissive-type volume hologram part 122 is a volume hologram (or a three-dimensional hologram) formed on the surface of the mirror part 121. The transmissive-type volume hologram part 122 is set so as to refract or diffract the display light L10. As a result, the transmissive-type volume hologram part 122 change the direction of the display light L10, which has traveled thereto in a straight line, to a preset direction. When the transmissive-type volume hologram part 122 receives the display light L10, it changes the direction of the received display light L10 and guides (i.e., directs) the light, whose traveling direction has been changed, to the mirror part 121.

The transmissive-type volume hologram part 122 may be formed directly on the surface of the mirror part 121 by a method such as a coating process. The transmissive-type volume hologram part 122 may be formed on a film, and then the film may be tightly joined to (e.g., stuck on) the mirror part 121 with no space therebetween.

By the above-described configuration, the display light reflection unit 120 changes the direction of the display light L10 received from the display light emitting unit 110 and reflects the display light L10, and by doing so, emits reflected light L20 to the windshield WS.

Figure 2:
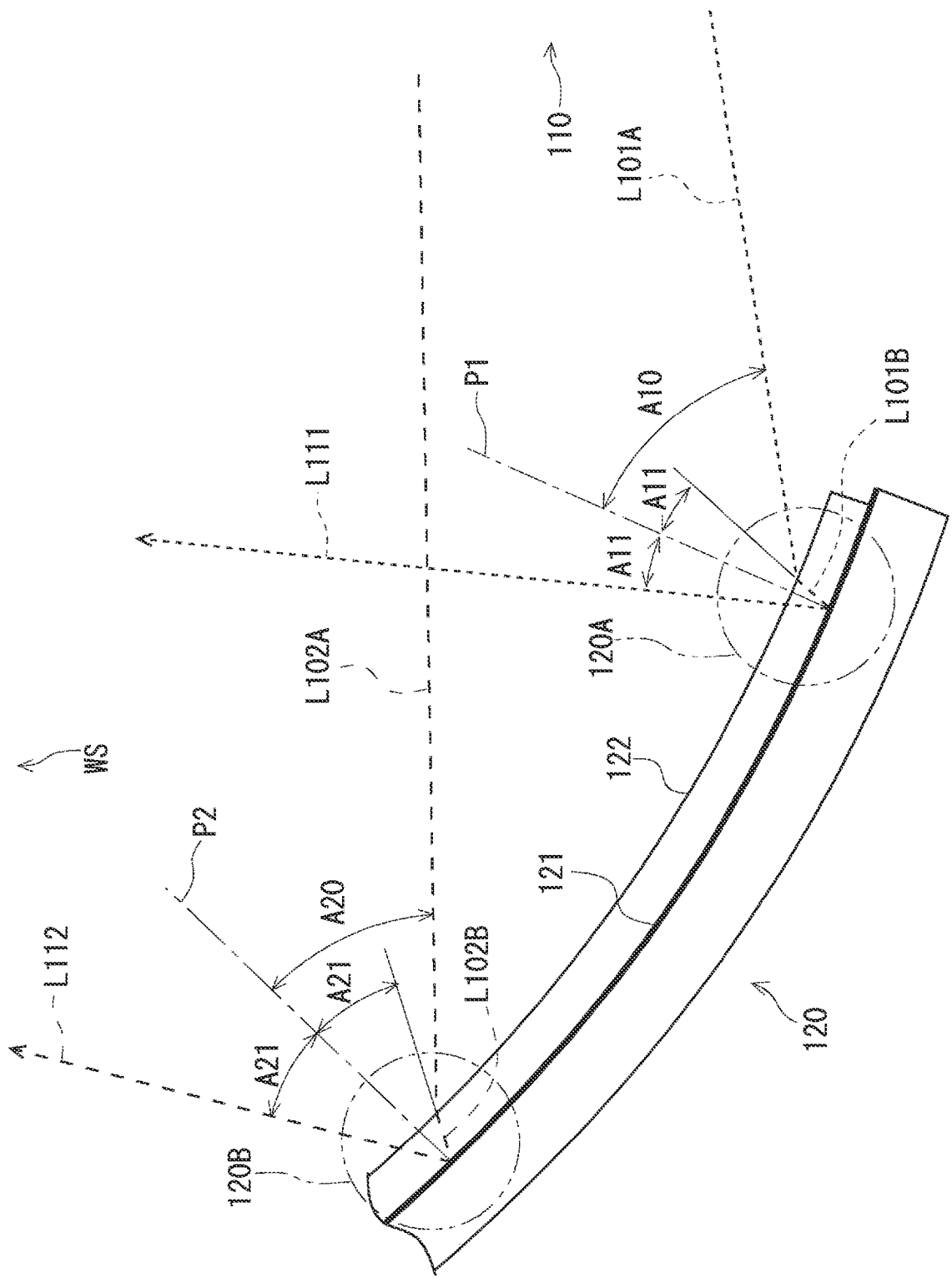
FIG. 2 is an enlarged view of a display light reflection unit in the head-up display apparatus.

Next, details of the display light reflection unit 120 will be described with reference to FIG. 2. FIG. 2 is an enlarged view of the display light reflection unit in the head-up display apparatus. FIG. 2 shows an enlarged view of an area from the central part to the lower part of the display light reflection unit 120 shown in FIG. 1. In FIG. 2, a first area 120A of the display light reflection unit 120 is shown in the lower part of the drawing, and a second area 120B thereof is shown in the central part of the drawing.

The first area 120A will be described hereinafter. A light beam L101A, which constitutes a part of the display light L10, is incident on the first area 120A. The incident angle of the light beam L101A with respect to the display light reflection unit 120 in the first area 120A is represented as an angle A10. The angle A10 is an angle between a normal P1, which is a line perpendicular to the mirror part 121 in the first area 120A, and the light beam L101A.

The light beam L101A is incident on the transmissive-type volume hologram part 122 in the direction of the angle A10, which is the incident angle. Upon receiving the light beam L101A, the transmissive-type volume hologram part 122 changes the direction of the light beam L101A by diffracting the light beam L101A, and thereby generates a light beam L101B, which is the diffracted light. The angle between the light beam L101B, which is the diffracted light, and the normal P1 (i.e., the diffraction angle) is an angle A11 smaller than the angle A10.

Therefore, in the first area 120A, the incident angle of the light beam L101B with respect to the mirror part 121 is the angle A11 smaller than the angle A10, i.e., smaller than the incident angle of the light beam L101A with respect to the display light reflection unit 120. Therefore, the reflection angle of the reflected light beam L111, i.e., the light beam that is generated as the light beam L101A is reflected by the mirror part 121, is the angle A11.

The display light reflection unit 120 is set so that the incident angle of the light beam L101A, which is originally the angle A10, becomes the angle A11 when it is incident on the mirror part 121 after passing through the transmissive-type volume hologram part 122. The angle A11 is smaller than the angle A10, i.e., smaller than the incident angle of the light beam L101A when the light beam L101A is incident on the mirror part 121 without passing through the transmissive-type volume hologram part 122.

As described above, by providing the transmissive-type volume hologram part 122 on the surface of the mirror part 121, the head-up display apparatus 10 can reduce the incident angle of the light beam incident on the concave mirror. Therefore, the head-up display apparatus 10 can reduce the aberration caused by the concave mirror.

Next, the second area 120B will be described. A light beam L102A, which constitutes another part of the display light L10, is incident on the second area 120B. The incident angle of the light beam L102A with respect to the display light reflection unit 120 in the second area 120B is represented as an angle A20. The angle A20 is an angle between a normal P2, which is a line perpendicular to the mirror part 121 in the second area 120B, and the light beam L102A.

The light beam L102A is incident on the transmissive-type volume hologram part 122 in the direction of the angle A20, which is the incident angle. Upon receiving the light beam L102A, the transmissive-type volume hologram part 122 changes the direction of the light beam L102A by diffracting the light beam L102A, and thereby generates a light beam L102B, which is the diffracted light. The angle between the light beam L102B, which is the diffracted light, and the normal P2 (i.e., the diffraction angle) is an angle A21 smaller than the angle A20.

Therefore, in the second area 120B, the incident angle of the light beam L102B with respect to the mirror part 121 is the angle A21 smaller than the angle A20, i.e., smaller than the incident angle of the light beam L102A with respect to the display light reflection unit 120. Therefore, the reflection angle of the reflected light beam L112, i.e., the light beam that is generated as the light beam L102A is reflected by the mirror part 121, is the angle A21.

The display light reflection unit 120 is set so that the incident angle of the light beam L102A, which is originally the angle A20, becomes the angle A21 when it is incident on the mirror part 121 after passing through the transmissive-type volume hologram part 122. The angle A21 is smaller than the angle A20, i.e., smaller than the incident angle of the light beam L102A when the light beam L102A is incident on the mirror part 121 without passing through the transmissive-type volume hologram part 122.

The details of the display light reflection unit 120 have been described above. The transmissive-type volume hologram part 122 is set so as to change the direction of the light beam L101A, which is originally incident at the angle A10, to the angle A11 in the first area 120A. The transmissive-type volume hologram part 122 is set so as to change the direction of the light beam L102A, which is originally incident at the angle A20, to the angle A21 in the second area 120B. As described above, the transmissive-type volume hologram part 122 is set so that the angle by which the direction of the display light is changed is set for each of the areas where the display light is received (i.e., set on an area-by-area basis) in the display light reflection unit 120. Further, the incident angle of the display light, which is set in the transmissive-type volume hologram part 122, is determined for each of the areas where the display light is received (i.e., determined on an area-by-area basis) based on the constraint of the place where the head-up display apparatus 10 is disposed and the relative positions of the display light emitting unit 110 and the display light reflection unit 120.

The above-described head-up display apparatus 10, combined with the transmissive-type volume hologram part 122 and the mirror part 121, can reduce the curvature of the mirror part 121. Therefore, the aberration caused in the mirror part 121 can be controlled. Further, by the above-described configuration, the head-up display apparatus 10 can prevent or reduce the distortion of displayed virtual images. Therefore, the head-up display apparatus 10 can increase the virtual-image surface.

Although an embodiment has been described above, the configuration of the head-up display apparatus 10 according to the embodiment is not limited to the above-described configuration. The display light emitting unit 110 in the head-up display apparatus 10 may include (i.e., generate) red, green and blue laser lights as its light sources. Further, the display light emitting unit 110 may include a reflective-type liquid-crystal panel, LCOS (Liquid Crystal On Silicon), or a scanning-type micro-mirror in place of the transmissive-type liquid-crystal panel in the display light generation part 112. According to the embodiment, it is possible to provide a head-up display apparatus capable of displaying satisfactory images while minimizing the increase in size of the apparatus.

Note that the present invention is not limited to the above-described embodiments, and they may be modified as appropriate without departing from the scope of the invention. For example, the above-described head-up display apparatus can be applied to vehicles other than the automobiles, such as aircraft and ships. Further, the aforementioned head-up display apparatus may be applied not only to vehicles but also to driving simulators for automobiles, flight simulators for airplanes, video game consoles, and the like.

The present invention can be used as a display device by which a user visually recognizes certain information in a vehicle such as an automobile, a ship, or an aircraft.

What is claimed is:

1. A head-up display apparatus configured to project a virtual image to be perceived by a user onto a virtual image display part provided in front of the user, comprising:
    a display light emitting unit configured to emit display light; and
    a display light reflection unit configured to reflect the display light and emit the reflected display light,
    wherein the display light reflection unit comprises a mirror part having a concave shape, and a transmissive-type volume hologram part provided on a surface of the mirror part;
    wherein the display light reflection unit is set so that an incident angle of the display light from the display light emitting unit when the display light is incident on the mirror part through the transmissive-type volume hologram part is smaller than the incident angle of the display light from the display light emitting unit when the display light is incident on the mirror part without passing through the transmissive-type volume hologram part.

2. The head-up display apparatus according to claim 1, wherein the transmissive-type volume hologram part is set so that an angle by which a direction of the display light emitted from the display light emitting unit is changed is set for each of areas where the display light is received.

3. A head-up display apparatus configured to project a virtual image to be perceived by a user onto a virtual image display part provided in front of the user, the head-up display apparatus comprising:
    a display light emitting unit configured to emit display light; and
    a display light reflection unit configured to reflect the display light and emit the reflected display light,
    wherein the display light reflection unit comprises a mirror part having a concave shape, and a transmissive-type volume hologram part provided on a surface of the mirror part, and
    wherein a curvature of the mirror part is suppressed by the transmissive-type volume hologram part;
    wherein the display light reflection unit is set so that an incident angle of the display light from the display light emitting unit when the display light is incident on the mirror part through the transmissive-type volume hologram part is smaller than the incident angle of the display light from the display light emitting unit when the display light is incident on the mirror part without passing through the transmissive-type volume hologram part.

4. The head-up display apparatus according to claim 3, wherein the transmissive-type volume hologram part is set so that an angle by which a direction of the display light emitted from the display light emitting unit is changed is set for each of areas where the display light is received.

5. A head-up display apparatus configured to project a virtual image to be perceived by a user onto a virtual image display part provided in front of the user, the head-up display apparatus comprising:
    a display light emitting unit configured to emit display light; and
    a display light reflection unit configured to reflect the display light and emit the reflected display light,
    wherein the display light reflection unit comprises a mirror part having a concave shape, and a transmissive-type volume hologram part provided on a surface of the mirror part, and
    wherein the transmissive-type volume hologram part is formed on the surface of the mirror part by at least one of coating treatment or on a film, and is bonded to the mirror part without gaps;
    wherein the display light reflection unit is set so that an incident angle of the display light from the display light emitting unit when the display light is incident on the mirror part through the transmissive-type volume hologram part is smaller than the incident angle of the display light from the display light emitting unit when the display light is incident on the mirror part without passing through the transmissive-type volume hologram part.

6. The head-up display apparatus according to claim 5, wherein the transmissive-type volume hologram part is set so that an angle by which a direction of the display light emitted from the display light emitting unit is changed is set for each of areas where the display light is received.

* * * * *